(12) United States Patent
Deco et al.

(10) Patent No.: US 7,079,688 B1
(45) Date of Patent: Jul. 18, 2006

(54) PATTERN RECOGNITION

(75) Inventors: Gustavo Deco, Neubiberg (DE); Bernd Schuermann, Haimhausen (DE)

(73) Assignee: Seimens Aktiengesellschaft, Munich (DE)

( * ) Notice: Subject to any disclaimer, the term of this patent is extended or adjusted under 35 U.S.C. 154(b) by 0 days.

(21) Appl. No.: 09/979,657

(22) PCT Filed: May 23, 2000

(86) PCT No.: PCT/DE00/01648

§ 371 (c)(1),
(2), (4) Date: Nov. 26, 2001

(87) PCT Pub. No.: WO00/73980

PCT Pub. Date: Dec. 7, 2000

(30) Foreign Application Priority Data

May 26, 1999 (DE) ................................. 199 24 010

(51) Int. Cl.
*G06K 9/46* (2006.01)

(52) U.S. Cl. ...................................... 382/190; 382/209

(58) Field of Classification Search ................ 382/153, 382/159, 181, 190, 195, 209, 218, 224, 305; 707/1–10

See application file for complete search history.

(56) References Cited

U.S. PATENT DOCUMENTS

| | | | |
|---|---|---|---|
| 4,783,829 A * | 11/1988 | Miyakawa et al. | 382/199 |
| 5,014,219 A | 5/1991 | White | |
| 5,159,745 A * | 11/1992 | Kato | 29/407.04 |
| 5,396,565 A * | 3/1995 | Asogawa | 382/159 |
| 5,748,769 A * | 5/1998 | Nishimura et al. | 382/159 |
| 5,830,141 A | 11/1998 | Makram-Ebeid et al. | |
| 5,995,652 A * | 11/1999 | Chiu et al. | 382/159 |
| 6,327,387 B1 * | 12/2001 | Naoi et al. | 382/190 |
| 6,636,634 B1 * | 10/2003 | Melikian et al. | 382/217 |

OTHER PUBLICATIONS

Rives, G. et al. "Prediction-Verification, Hypothesis Accumulation for Scene Analysis by Object Identification" Computer Vision for Robots, vol. 595, Dec. 2-6, 1985, pp. 300-305.

(Continued)

*Primary Examiner*—Daniel Miriam
(74) *Attorney, Agent, or Firm*—Staas & Halsey LLP

(57) ABSTRACT

In a pattern recognition system, a pattern which is to be recognized later is prescribed in a learning phase. This pattern is detected sequentially, that is to say the informative areas of the pattern are detected and, moreover, the spatial relationship between the areas is also stored. In the recognition phase, a hypothesis which indicates a presumed pattern and, furthermore, indicates where such further prominent areas should be located in the pattern to be recognized if the presumption is correct, is generated on the basis of the acquired data of a first area of a pattern to be recognized, and on the basis of the stored data. Thus, patterns are learned through their location information, on the one hand, and through their spatial relationship to each other, on the other hand, stored and then re-recognized. The application options of the present invention reside, for example, in robotics, text analysis and image analysis, but also in the field of medical technology (for example in automatic tumor detection in mammographies, etc).

9 Claims, 2 Drawing Sheets

OTHER PUBLICATIONS

Chiuo, Y. et al. "Application of Neural Network Based Hybrid System for Lung Nodule Detection" IEEE, Jun. 13, 1993, pp. 211-216.

Yuncai, L. et al. "Determining Straight Line Correspondences From Intensity Images", Pattern Recognition, vol. 24, No. 6, 1991, pp. 489-504.

Parvin, B. et al. "A Layered Network for the Correspondence of 3D Objects", Proceedings of the 1991 IEEE International Conference on Robotics and Automation, pp. 1808-1813.

Marr, "Vision: A Computational Investigation into the Human Representation and Processing of Visual Information", New York, Freeman, 1982, pp. 268-333.

Lu S. et al., "Hierarchical Attributed Graph Representation and Recognition of Hand-written Chinese Characters", Pattern Recognition, vol. 24, No. 7, pp. 617-632, 1991.

Cheng F. et al., "Recognition of Handprinted Chinese Characters via Stroke Relaxation", Pattern Recognition, vol. 26, No. 4, 1993, pp. 579-593.

* cited by examiner

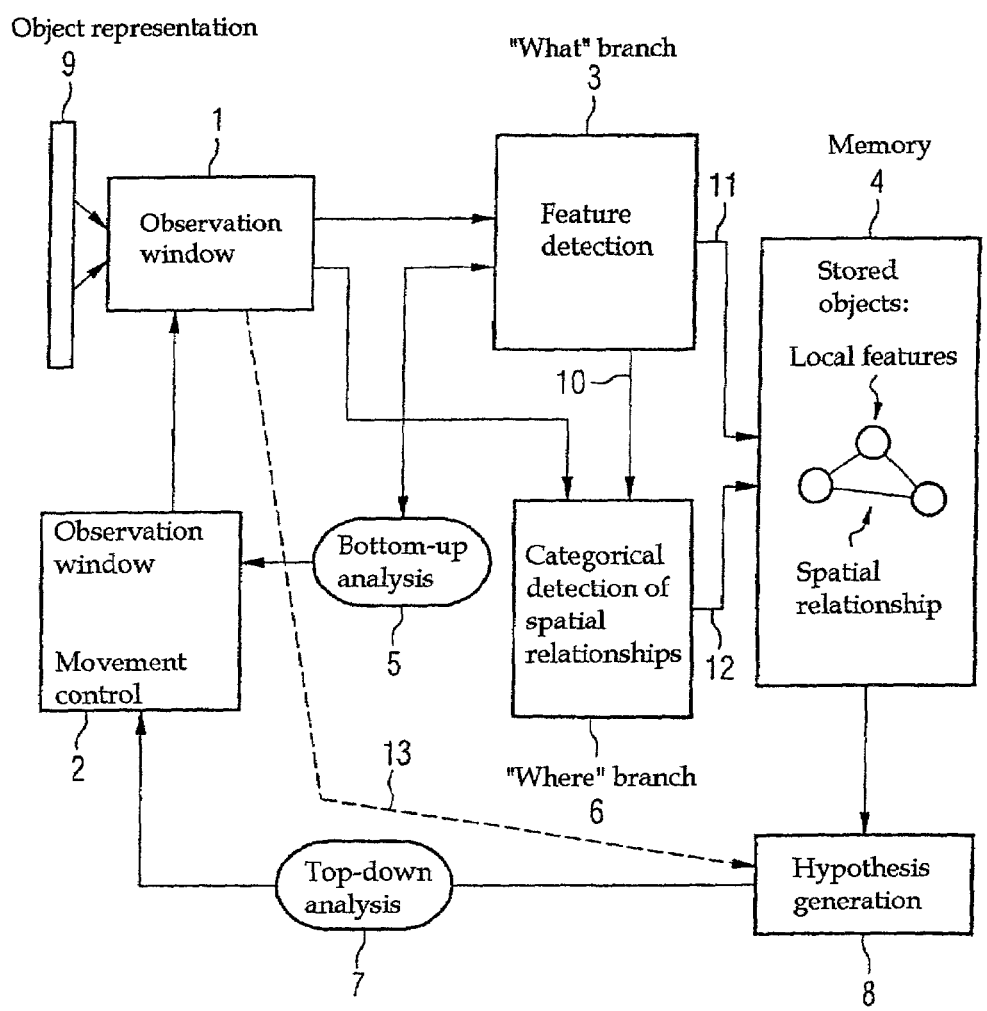

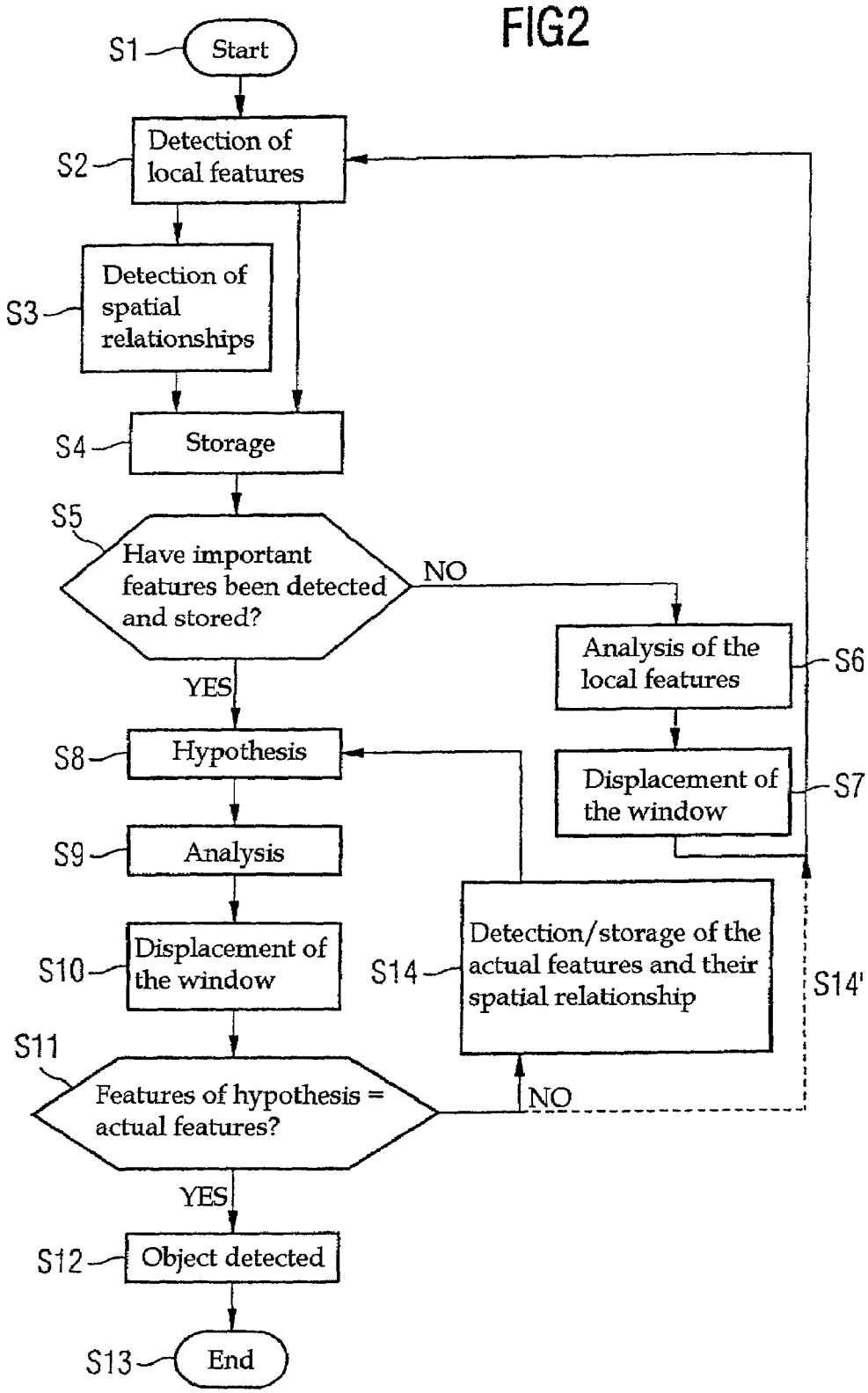

PATTERN RECOGNITION

CROSS REFERENCE TO RELATED APPLICATIONS

This application is based on and hereby claims priority to Patent Application No. 19924010.8 filed on May 26, 1999 in Germany, the contents of which are hereby incorporated by reference.

BACKGROUND OF THE INVENTION

1. Field of the Invention

The present invention relates in general to the field of pattern recognition and, more particularly, to a learning method for a pattern recognition system, to a method for re-recognizing at least one pattern, to a pattern recognition system and to the use of such a pattern recognition system.

2. Description of the Related Art

Pattern recognition herein refers to predetermined patterns to be re-recognized which are fed in advance to a technical system or, in other words, that the pattern recognition system is trained. The pattern recognition system is intended to re-recognize later these patterns on which it has been trained in advance.

In this case, "pattern" in the meaning of the present invention is to be understood as any two-dimensional or multidimensional representation of sensory impressions. Patterns in the meaning of the present invention can therefore naturally be images of physical objects. Further sensory impressions can be smell or sound signals. In the case of sound signals, the two-dimensional representation can be, for example, a frequency spectrum or the amplitude characteristic as a function of time.

There are, of course, many concrete applications of pattern recognition. Mention may be made, as an example, of, on the one hand, robotics, the pattern recognition system in this case serving the purpose of having the robot pick up predetermined objects (which in this case represent the trained patterns), for example from an assembly line or the like.

A further possible field of application is represented in general by medical technology. For example, the pattern recognition system can recognize tumor diseases on images of medical imaging systems when the pattern recognition system has been trained on typical syndromes of tumors as patterns.

In an application to acoustic signals, a pattern recognition system can recognize, for example, trained sounds in a noisy spectrum.

A substantial point with regard to the technical implementation of a pattern recognition system is the way in which the information that is reproduced in the pattern is fed to the pattern recognition system. It is known in this case from the prior art to implement such technical systems by what is termed a feed-forward approach such as is explained, for example, in Marr, "Vision: A Computational Investigation into the human Representation and Processing of visual Information", New York, Freeman, 1982. Feed-forward means in essence in this case that only information on the pattern to be recognized is processed, in particular in the recognition phase of pattern recognition. It has emerged in the meantime that this feed-forward approach is inadequate in the case of technical implementation in that the resulting processing speeds are too slow.

SUMMARY OF THE INVENTION

It is therefore an object of the present invention to provide a technique for pattern recognition which permits a more efficient technical implementation.

In accordance with a first aspect, a learning method is provided for a pattern recognition system. In this case, at least one pattern to be recognized is provided, that is to say the pattern recognition system is fed information (data) of the pattern, that is to say of the two-dimensional representation of sensory impressions. Data which in each case reproduce areas of the prescribed pattern are then acquired. It is advantageous in this case to select those areas which are particularly informative. In the case of a two-dimensional image, these are usually areas which have a high contrast such as, for example, striking discontinuities in the luminance information or color information. Furthermore, the relative spatial relationships between at least two areas reproduced by the data are detected. In the case of a frequency spectrum, this can be the spacing between two areas, for example. In the case of a two-dimensional image, this is usually the relative position of the corresponding areas. The detection of the spatial relationships between the areas is performed separately from the acquisition of the actual data of the corresponding areas. The data which reproduce the areas of the prescribed pattern, and the spatial relationships between the areas are then stored.

The acquisition and storage of the data which reproduce the areas of the prescribed pattern, and the detection and storage of the spatial relationships between the areas can be performed serially in this case.

The pattern can be an image of a physical object. These physical objects can be, for example, objects which are to be manipulated by a robot.

The at least one prescribed pattern can also be an image, generated by an imaging system, of a syndrome such as, for example a tumor.

In accordance with the invention, a method is also provided for re-recognizing at least one pattern. Data which characterize at least one pattern to be re-recognized are stored in advance in this case. This can be performed, in particular, using a method as set forth above. In the case of the actual re-recognition, data are then acquired from at least one area of the pattern to be recognized. What is termed a hypothesis is then generated on the basis of the data, stored in advance, and the acquired data of the at least one area of the pattern to be recognized. The hypothesis specifies in this case the pattern characterized by the stored data which presumably corresponds to the pattern to be recognized. Data of at least one further area of the pattern to be recognized are acquired and compared with the stored data which characterize the corresponding area of the presumed pattern. If the data of the at least one further area of the pattern to be recognized substantially match the stored data, which characterize the corresponding area of the presumed pattern, the pattern to be recognized is deemed to be identified as the presumed pattern, and therefore re-recognized. "Substantially match" means in this case that in the technical implementation a certain identity threshold value (for example a predetermined percentage of correspondence) is prescribed upon the overshooting of which the corresponding data are assumed to be matching.

The hypothesis can be generated, for example by an artificial neural network.

The method for re-recognition can be carried out technically with particular effectiveness when the at least one further area which serves for verifying the hypothesis is selected on the basis of the hypothesis. The hypothesis can therefore be analyzed as to where a further area of the pattern to be recognized has to be present if the present pattern is actually the presumed pattern in this case. For the case in which the data of the at least one further area of the pattern to be recognized do not substantially match the stored data (and therefore the hypothesis turns out to be false, that is to say the presumed pattern does not correspond to that to be recognized), a further hypothesis is generated and, as already set forth above, is verified with aid of a yet further area.

A pattern recognition system is further provided in accordance with the present invention. The system has a memory in which data are stored which characterize at least one pattern to be re-recognized. Also provided is a system to acquire the data of at least one area of a pattern to be recognized and to generate a hypothesis based on the data in the memory and based on the acquired data of the at least one area of the pattern to be recognized, the generated hypothesis specifying a presumed pattern from the patterns which are characterized by the data stored in advance. The acquisition system is designed so that the data of at least one further area of the pattern to be recognized are acquired and compared with the data in the memory which characterize the corresponding area of the presumed pattern. The presumed pattern is deemed to be re-recognized (identified) when the data of the at least one further area of the pattern to be recognized substantially match those data in the memory which characterize the corresponding area of the presumed pattern. The hypothesis may be generated by an artificial neural network.

The system can have an analyzer which selects the at least one further area of the pattern to be recognized as a function of the generated hypothesis. Thus, by contrast with the feed-forward approach of the prior art (see above), this analyzer is an analyzer which operates in accordance with a top-down technique. In this case, top-down means that information already present, for example information stored in advance, for example in the recognition phase, are also included.

The system designed as set forth above can be used, in particular, for detecting objects to be manipulated by a robot. It can be used, furthermore, for detecting typical syndromes.

The technical advantage of the technique represented is, in particular, that the detection can be performed serially in the learning and/or recognition phase. By contrast with a parallel overall detection of the information of a pattern to be learned or to be recognized, this serial detection requires less arithmetic capability and can be effectively implemented with the aid of classical serial computing architecture.

BRIEF DESCRIPTION OF THE DRAWINGS

Further properties, advantages and features of the present invention will now be explained in more detail with reference to an exemplary embodiment and to the figures of the attached drawings, in which:

FIG. 1 is a block diagram of a system according to the invention for detecting objects on the basis of neurocognitive perceptions, and FIG. 2 is a flowchart for recognizing objects.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Referring to FIG. 1, the aim firstly is to explain the subassemblies of a system according to the invention for recognizing patterns. A flowchart which explains the controlled interaction of these subassemblies is therefore explained with reference to FIG. 2.

It may be mentioned that, in accordance with the exemplary embodiments, the recognition is performed visually, but that the invention can likewise be designed on the basis of other sensory perceptions such as, for example, acoustic perceptions.

In this case, the reference numeral denotes in FIG. 1 means for completely representing a pattern (object) to be recognized. These means can be, for example, a planar image sensor 9. The reference numeral 1 denotes in FIG. 1 means which can displace an observation window in the manner of a search light over the entire surface of the planar image sensor 9. These means can be, for example, means for selectively reading out predetermined sections of the planar image sensor 9. Output signals of the observation window 1, which therefore reproduce the visual features of the area currently situated in the window or of a section of the representation of the object by the planar image sensor 9, are passed in accordance with the present invention on the one hand to what is termed a "what" branch 3 and, on the other hand, to what is termed a "where" branch 6. The "what" branch 3 is responsible in this case for detecting local features such as, for example, edges, structures of colors of the corresponding section of the object 9, whereas the "where" branch 6 is responsible for categorically detecting spatial relationships of the corresponding local features such as set forth above. For this purpose, the "where" branch is connected to the "what" branch by a line 10 by which the "where" branch 6 is fed the corresponding detected local features of the "what" branch 3.

The "what" branch 3 and the "where" branch 6 are respectively connected via a line 11 or 12, respectively, to a memory 4 which is an associative graphics memory. The local features and their spatial relationship are stored graphically in the memory 4. This is performed here with regard to a plurality of objects during a training phase of the system. Not until after termination of the training phase is the evaluation of the content of the memory 4 undertaken in the actual application phase of the system.

The displacement of the observation window 1 is driven by an observation window movement controller 2 (observation window controller). The observation window movement controller 2 executes this movement control as a function of two fed analysis signals, specifically an analysis signal from the bottom-up analyzer 5, and a second analysis signal from a top-down analyzer 7.

The bottom-up analyzer 5 analyzes the detected local features of the "what" branch 3. By contrast therewith, the top-down analyzer 7 uses a hypothesis generator 8 which is connected, in turn, to the memory 4 and uses the results stored in the memory 4 during the training phase to generate a hypothesis.

The system illustrated in FIG. 1 is therefore, firstly, capable of executing lower functions, specifically by the bottom-up analyzer 5, which directly evaluates the detected features of the detected "what" branch 3 and cannot use the memory 4. The bottom-up analyzer 5 therefore makes use only of sensor input signals.

The system illustrated can, for example, execute higher-order functions by the top-down analyzer 7 and the hypothesis generator 8. The top-down analyzer 7 and the hypothesis generator 8 are, specifically, connected to the memory 4 such that they can use feeding stored findings from a training phase of the system.

The system illustrated solves the problem of limited memory resources that is inherent to the visual recognition of objects by virtue of the fact that a window mechanism 1 is provided for reducing the incoming visual information, as a result of which the limited information resources of the system (resources of the corresponding processors) are not exceeded. Only the information inside the observation window is subjected to further processing at a higher level.

The system illustrated in FIG. 1 has the "what" detection branch 3 and the "where" detection branch 6, and so object properties and/or spatial properties can be processed in separate branches. The object properties include shape, colors and structure of the object to be recognized.

The "where" detection branch 6 for categorical detection of spatial relationships detects, for example, positions, size and the like of the local features detected by the "what" detection branch 3. Whereas, thus, the "what" detection branch 3 is responsible for obtaining primary properties of the section of the observation window 1, the "where" detection branch 6 serves for determining categorical spatial relationships (left, right, etc) between two groups of local features which are assigned to different positions in the observation window. These two types of information (local features of spatial relationships between them) are graphically stored in an associative memory during a learning phase. The nodes of this diagram respectively store the set of local features which has been detected by the "what" detection branch 3 at various positions traversed by the observation window 1 in raster fashion, and the characteristics illustrated in FIG. 1 categorically store the spatial relationship between two nodes which have been detected by the "what" detection branch 3. During the learning phase before the actual application phase, only analysis by the bottom-up analyzer 5 is performed, and so only sensor information is used and most of the interesting areas of the objects such as, for example, projecting edges, are traversed and analyzed. As a result, an invariant reproduction of an object is stored as a memory record in the memory 4, the memory record being defined by the local features (local edges) and the corresponding spatial relationships.

The system illustrated in FIG. 1 also permits what is termed a top-down analysis by the top-down analyzer 7. The top-down analyzer 7 serves in this case to displace the observation window on the basis of iterative tests and hypotheses which, and this is performed by the hypothesis generator 8 on the basis of the findings stored in the memory 4. In other words, during the actual recognition phase or application phase not only is use made of a bottom-up analysis by the bottom-up analyzer 5 on the basis of sensory information for the displacement of the observation window 1—rather, the observation window 1 is displaced on the basis of the information stored in the memory 4 to areas of the object representation 9 in which the hypothesis generator 8 expects predetermined local features. In this way, hypotheses which are generated by the hypothesis generator 8 are confirmed or rejected iteratively. This analysis/synthesis loop is executed until the hypothesis which the hypothesis generator 8 has generated and the top-down analyzer 7 has analyzed in relation to the movement of the observation window 1 is successfully confirmed, something which means that the object has been recognized as a whole.

The limited capacity of the memories, processors and the like used for implementation is not overtaxed by the creation of the various subsystems, represented and named above, of the system according to the invention. The required capacity (resources) is produced, furthermore, according to the invention by the observation window 1, which resembles a search light and can traverse the object in raster fashion. The "what" subsystem analyzes a primary local features of the section of the object in the observation window 1, while the spatial relationship between the local features can be detected and analyzed by the "where" subsystem. The findings of these two subsystems are stored in the memory 4. The hypothesis can then be generated on line in the top-down fashion. For a next movement (displacement) of the observation window 1 is then performed iteratively on the basis of this hypothesis. When the features which are detected after the displacement of the observation window 1 match the features that are to be expected of the hypothesis generated by the hypothesis generator 8, this means that the object has actually been recognized. By this iterative procedure in conjunction with utilization of the stored findings in the memory 4, the observation window 1 is displaced to call up (read out) further information in order to check whether the object really has been recognized or, in other words, whether the features assumed by the hypothesis match the actual features of the object. The system illustrated therefore constitutes an active visual system for object recognition.

With reference to FIG. 2, the aim now is to explain the interaction of the subassemblies of the system of FIG. 1 in more detail. Two phases are essentially executed in this case:

the learning or training phase, in which all important areas of a pattern to be recognized are traversed by the observation window and stored, and the actual recognition phase, in which hypotheses are generated and verified on the basis of the findings stored in the training phase. When the hypothesis is confirmed (presumed features in accordance with the hypothesis being essential identical to the actual features of the object), the pattern is recognized as being correct.

The individual steps are now to be described in more detail:

Firstly, the sequence is started in step S1. The area of the pattern which is currently situated in the section (detection area) of the observation window is detected in step S2. Spatial relationships of the areas are detected in step S3 on the basis of the findings of the step S2. The data of the areas and their spatial relationships are stored in step S4. With the aid of the memory content, a check is made in step S5 as to whether sufficiently informative and thus all the important areas of the pattern have been detected and stored. For the case in which the check of step S5 is negative, the local features are analyzed in the bottom-up fashion in step S6. The observation window is displaced in step S7 as a function of the result of the analysis in step S6, and the processing goes back to step S2. Steps S2 to S7 therefore constitute the learning of training phase to which all important areas of a prescribed pattern to be recognized are traversed by the observation window, detected and stored. Steps S2 to S7 are repeated in this case until the important areas of the pattern and their spatial relationships have been detected and stored.

If the check in step S5 goes positively, the hypothesis is created in step S8 on the basis of the memory content, and specifies the presumed data in areas which have so far not been traversed/detected. The hypothesis is analyzed in step S9 (top-down analysis), and the observation window is displaced in step S10 as a function of the result of the analysis. A check is made in step S11 as to whether in the newly traversed and detected area the acquired data match the actual data of the pattern in this area in accordance with the hypothesis. If the check is negative and the current hypothesis is therefore rejected, which means that the pattern has not been recognized, the actual data of the areas and their spatial relationships are acquired and detected in step S14 and stored, and the processing goes back to step S8.

Alternatively, it is possible, for example given excessively large deviations between the presumed data of the further area in accordance with the hypothesis and the actual data of the pattern for the detection phase to be aborted and the learning or training phase (steps S2 to S7) to be resumed. If in step S11 in the newly traversed and detected area the presumed data in accordance with the hypothesis match the actual data of the pattern in this area, this means that the hypothesis has been confirmed and the pattern has therefore been recognized. The sequence can therefore be terminated in a step S13.

The steps S8 to S14 therefore constitute the actual recognition phase in which hypotheses are created and verified on the basis of the findings stored in the training phase.

Thus, to summarize, a pattern that is to be recognized later, that is to say a two- or multidimensional representation of sensory impressions, is prescribed in the learning or training phase. This pattern is detected sequentially, that is to say data of informative features (edges, projections, etc. in the case of a two-dimensional image) are automatically detected, on the one hand, and the spatial relationship between these areas is also stored, in addition. Areas which have already been detected (visited) are never detected again anew during the learning phase. For a given pattern, the learning phase runs until all the "interesting" areas of the pattern to be detected and learned have been traversed.

The aim in the recognition phase is to re-recognize patterns stored in the learning phase, and this means that the patterns are also to be re-recognized whenever they have been modified within certain limits by comparison with the originally learned pattern (rotation, deformation, noisiness, . . .). In the recognition phase, a prominent, informative area of the pattern to be recognized is firstly analyzed. Starting from this initial information, a first hypothesis is generated by calibration with the stored patterns. This hypothesis thus constitutes a presumed pattern. Consequently, the attention window is displaced on the basis of the hypothesis to where further prominent areas are to be present in accordance with the hypothesis. The hypothesis can change repeatedly in the course of a recognition phase, since detected areas are further processed serially and fed to the memory 4. The size of the attention window can, but need not, be varied.

For the case in which a hypothesis turns out to be false in the course of the learning phase (the corresponding data of the area do not match the stored data of the corresponding area of the presumed pattern), the current hypothesis is rejected and the next best hypothesis is verified. Since a hypothesis is created in the recognition phase immediately after the detection of the data of a first area of the pattern to be recognized, and, to be more precise, a ranking list of possible hypotheses is created, the initially generated hypothesis can, of course, be completely incorrect.

The technical advantage of the technique represented is, in particular, that the detection in the learning and/or recognition phase can be performed serially. By contrast with a parallel overall detection of the information of a pattern to be learned or to be recognized, this serial detection requires less arithmetic capability and can be implemented effectively with the aid of classical serial computing architectures.

The invention has been described in detail with particular reference to preferred embodiments thereof and examples, but it will be understood that variations and modifications can be effected within the spirit and scope of the invention.

The invention claimed is:

1. A pattern recognition system for determining a match between a recognition area of a pattern to be recognized and a reference area of a reference pattern, comprising:
    storage means for storing prescribed reference areas of a prescribed reference pattern, and prescribed relative spatial reference relationships, each prescribed relative spatial reference relationship describing relative spatial positions between two of the prescribed reference areas;
    selection means for selecting a first recognition area from a pattern to be recognized;
    comparing means for comparing the first recognition area with the prescribed reference areas to select a first reference area from the prescribed reference areas of the prescribed reference pattern;
    first selection means for selecting a second reference area from the prescribed reference areas by using the first reference area and one of the prescribed relative spatial reference relationships which describes a relative position of the first reference area with respect to the second reference area, wherein the second reference area is formulated as a hypothesis for a presumed second recognition area;
    second selection means for selecting a second recognition area from the pattern to be recognized by using the first recognition area and the one prescribed relative spatial reference relationship which describes the relative position of the first reference area with respect to the second reference area, and
    determination means for determining a match between the second recognition area and the second selected reference area, wherein said determining of the match determines whether the hypothesis is verified.

2. The pattern recognition system as claimed in claim 1, wherein the pattern to be recognized is recognized as the prescribed reference pattern if the match exceeds a prescribable threshold, and otherwise the pattern to be recognized is not recognized as the prescribed reference pattern.

3. A method for determining a match between a reference area from a reference pattern and a recognition area from a pattern to be recognized, the reference pattern having prescribed reference areas and relative spatial reference relationships which in each case describe relative spatial positions between the reference areas, comprising:
    selecting a first recognition area from the pattern to be recognized;
    determining a first reference area from the prescribed reference areas by comparing the first recognition area with the prescribed reference areas;
    determining a second reference area from the prescribed reference areas by using the first reference area and one of the relative spatial reference relationships which describes a relative position of the first reference area with respect to the second reference area, wherein the second reference area is formulated as a hypothesis for a presumed second recognition area;
    determining a second recognition area from the pattern to be recognized by using the first recognition area and the one relative spatial reference relationship which describes the relative position of the first reference area with respect to the second reference area; and determining a match between the second recognition area and the second selected reference area, wherein said determining of the match determines whether the hypothesis is verified.

4. The method as claimed in claim 3, wherein the pattern to be recognized is recognized as the reference pattern when a first prescribed measure of matching is achieved, and otherwise the pattern to be recognized is not recognized as the reference pattern.

5. The method as claimed in claim 4, further comprising, in case of non-recognition of the pattern to be recognized, repeating said determining of the second reference area, the second recognition area and the match using a different one of the relative spatial reference relationships.

6. The method as claimed in claim 5, wherein said repeating is carried out iteratively until the pattern to be recognized is recognized as the reference pattern, or a second prescribed measure of matching is reached.

7. The method as claimed in claim 3, wherein the hypothesis is generated by using an artificial neural network.

8. The method as claimed in claim 3, wherein the pattern to be recognized describes an object to be manipulated by a robot 9. The method as claimed in claim 3, wherein the pattern to be recognized is an image, generated by an imaging system, of a clinical picture.

* * * * *